May 14, 1940.   P. K. MORRIS   2,200,290
SAFETY PIN
Filed May 11, 1939
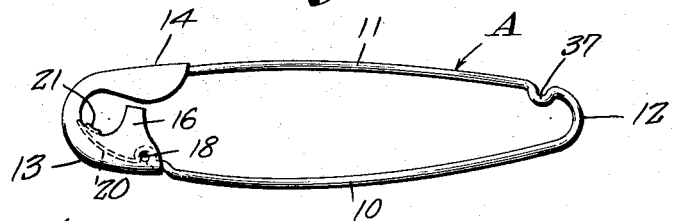
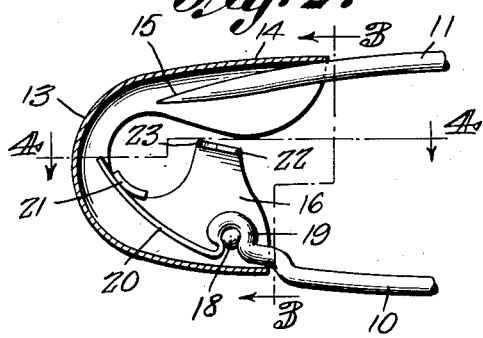
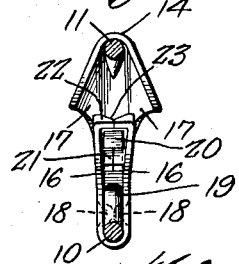
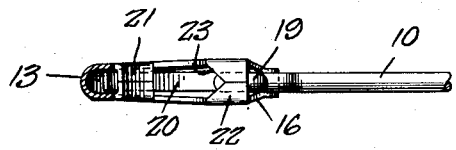
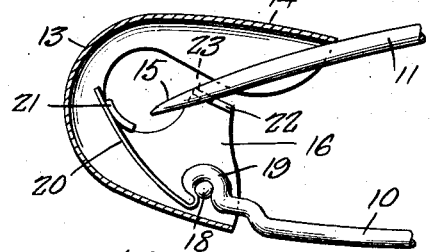
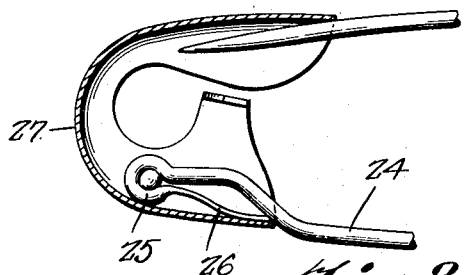
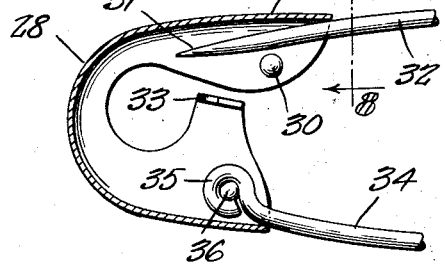
Paul K. Morris, INVENTOR
BY Victor J. Evans & Co.
ATTORNEYS
P. L. Hickey
WITNESS Patented May 14, 1940

2,200,290

UNITED STATES PATENT OFFICE 2,200,290

SAFETY PIN

Paul K. Morris, Uniontown, Pa.

Application May 11, 1939, Serial No. 273,107

5 Claims. (Cl. 24—157)

The invention relates to a pin construction and more especially to a safety pin.

The primary object of the invention is the provision of a pin of this character wherein in its construction a maximum amount of safety is assured in the use thereof in that when the pin is engaged in wearing apparel or a piece of work it cannot become accidentally open because it requires special manipulation of the opening of the pin.

Another object of the invention is the provision of a pin of this character wherein a safety sion of a pin of this character wherein a safety guard is entirely eliminated and the shield of such pin for the pointed tine thereof is of such a character that it will adjust itself in event that pressure is exerted upon the pin accidentally without any liability of the pin opening, the shield being of novel construction in its entirety and functions as a guard for the pointed tine of the pin in the wearing thereof.

Another object of the invention is the provision of a pin of this character wherein the pointed tine of the pin when in closed position will be guarded and cannot possibly work loose for the opening of the pin during the wearing thereof or in the use of the same, being manually released for the opening of said pin.

A still further object of the invention is the provision of a pin of this character wherein the frame thereof is so constructed to avoid possibility of undue displacement of the pin when engaged in a garment and avoid interference in the removal of the pin from the garment when the occasion requires.

A still further object of the invention is the provision of a pin of this character which is simple in its construction, thoroughly reliable and efficient in operation, readily and easily manipulated assuring maximum safety in the use thereof, strong, durable and inexpensive to manufacture.

With these and other objects in view, the invention consists in the features of construction, combination and arrangement of parts as will be hereinafter more fully described in detail, illustrated in the accompanying drawing, which discloses the preferred and modified forms of the embodiment of the invention and pointed out in the claims hereunto appended.

In the accompanying drawing:

Figure 1 is a side elevation of a pin constructed in accordance with the invention being in closed position.

Figure 2 is an enlarged fragmentary vertical longitudinal sectional view thereof.

Figure 3 is a sectional view taken on the line 3—3 of Figure 2 looking in the direction of the arrows.

Figure 4 is a sectional view taken on the line 4—4 of Figure 2 looking in the direction of the arrows.

Figure 5 is a view similar to Figure 2 showing the shield in a displaced position assuring against the unfastening of the pin.

Figure 6 is a view similar to Figure 2 showing a slight modification of the invention.

Figure 7 is a view similar to Figure 6 showing a still further modification of the invention.

Figure 8 is a sectional view taken on the line 8—8 of Figure 7 looking in the direction of the arrows.

Similar reference characters indicate corresponding parts throughout the several views in the drawing.

Referring to the drawing in detail, particularly Figures 1 to 5 inclusive which are illustrative of the preferred embodiment of the invention, A designates generally the safety pin constructed in accordance with said invention. The safety pin A comprises a wire frame preferably formed from a single length of wire bent on itself to provide a back leg or member 10 and an opening and closing leg or member 11, these joined with each other at the bight 12 and the wire frame is of inherent resiliency so that the leg or member 11 which is the pointed tine or pin proper will spring to an open position and requires pressure thereon to move it to a closed position.

Associated with the leg or member 10 to become a part of the frame of the safety pin is a shield 13 formed with a keeper 14 of inverted substantially V-shape in cross section for receiving the pointed end 15 of the leg or member 11 and opposed spaced side cheeks or lobes 16 which are of inwardly tapered formation and extend in the direction of the keeper 14 for creating between the latter at opposite sides thereof and the said cheeks 16, side entrance and exit mouths 17, the sides of the keeper 14 being reversely inclined to each other and merge one with the other at the longitudinal center of the keeper. Instruck from the cheeks 16 are pivot lugs 18 engaging an open eye formation 19 built in the leg or member 10 of the frame so that the said shield 13 will be pivoted to the leg or member 10 for eccentric movement about an axis created by the lugs 18.

The eye 19 has formed therewith a leaf spring 20 which is curved in its formation and rides against and saddles an abutment constituted by inwardly struck or inwardly turned ears 21 bent from the cheeks 16 so that the shield in its pivotal movement is subjected to tension by the spring 20.

The cheeks 16 are formed next to the keeper 14 between the entrance mouths 17 with inturned lips 22, these being cut to effect a centered V-shaped seat or notch 23 therebetween for receiving the pointed end 15 of the leg or member 11 when pressure is accidentally applied to the frame of the safety pin A and in this manner latching the leg or member 11 from accidentally opening or springing out of the mouths 17 at either side, of the keeper 14. This inward pressure upon the frame from either leg or member side thereof causes the shield 13 to eccentrically move in an arcuate direction to the position shown in Figure 5 of the drawing and in this way guiding the pointed end 15 of the leg or member 11 into the notch or seat 23 so that there is no liability of this leg or member 11 becoming free from the shield or springing to an open position particularly when the safety pin A is being worn and engaged in a garment.

When the leg or member 11 is in open position or free from the shield 13 the shield assumes the tilted position shown in Figure 5 of the drawing being the normal position thereof. Now to engage the leg or member 11 with the shield 13 it is necessary that pressure be applied to the side of the shield next to the pivot 18 swinging the shield 13 to the position shown in Figures 1 and 2 of the drawing and thereafter the pointed end 15 of the leg or member 11 can freely pass into either mouth 17 at opposite sides of the keeper 14 for engaging therein. When the pointed end 15 of the leg or member 11 is engaged in the keeper 14 the outward tension of the leg or member will hold the shield 13 in that position shown in Figures 1 and 2 of the drawing.

In Figure 6 of the drawing there is shown a slight modification of the invention wherein the leg or member 24 of the frame of the safety pin has at the eye 25 built therein a leaf spring 26 disposed in the position shown aond active against the shield 27 for tensioning the same under eccentric movement of such shield.

In Figures 7 and 8 there is shown a further modification of the invention wherein the shield 28 at the keeper 29 thereof has built in opposite sides of the same inwardly tapered lugs or tits 30 which direct the pointed end 31 of the leg or member 32 of the safety pin to the seat 33 in the shield 28 so as to eliminate accidental opening movement of the leg or member 32, the leg or member 34 of the safety pin in this instance being devoid of a leaf spring yet it carries a pivot eye 35 for the pivot 36 eccentrically connecting the shield 28 with said frame. To open the leg or member 32 it is necessary to initially pass the pointed end 31 thereof between the lugs or tits 30 and then move such leg or member 32 laterally to either side of the frame of the safety pin resulting in the freeing of the said leg or member 32 from the shield 28 or in the opening of the said safety pin.

By the construction hereinbefore set forth the safety pin in the use thereof is assured a maximum degree of safety against accidental opening of such pin, there being required special manipulation of the latter for the opening of its pointed leg or tine in that the shield is held against eccentric movement when it is required that the pointed leg or tine be opened and for the passage of the latter through either mouth 17 laterally to opposite sides of the frame of the pin.

The leg or tine 11 has provided therein a bight 37 which constitutes a limit or stop projection so that the leg or tine 11 can be forced into a garment to a limited extent and when the safety pin is fastened closed it is held against displacement in the fastened position thereof.

The frame opens at the side having the leg or member 11 and between the shield 13 and the bight 12, the stop 37 being close to the said bight 12.

The cheeks of the shield are centered with respect to the keeper 14 and the pointed leg or member 11 is engageable in this keeper 14 from either side of the shield at the cheek areas thereof through each mouth 17 created in this shield. The shield 13 in its makeup is in reality a head to the frame and is a concealing guard for the pointed end 15 of the leg or member 11 when the said pointed end is engaged therein.

What is claimed is:

1. A safety pin comprising a frame having a springy pointed tine, an eccentric movable shield connected with said frame and receiving the pointed end of said tine, a keeper formed with the shield and laterally spread to opposite sides of the frame, cheeks formed with the shield and directed toward the said keeper and having a seat for receiving the pointed end of said tine when engaged in the shield, and a spring associated with the frame and coacting with the shield for tensioning the same under eccentric movement thereof.

2. A safety pin comprising a frame having a springy pointed tine, an eccentric movable shield connected with said frame and receiving the pointed end of said tine, a keeper formed with the shield and laterally spread to opposite sides of the frame, cheeks formed with the shield and directed toward the said keeper and having a seat for receiving the pointed end of said tine when engaged in the shield, and a spring associated with the frame and coacting with the shield for tensioning the same under eccentric movement thereof, the said keeper being constructed to guide the pointed end of the tine in the direction of the seat for the entry of the pointed end therein.

3. A safety pin comprising a frame having a springy pointed tine, an eccentric movable shield connected with said frame and receiving the pointed end of said tine, a keeper formed with the shield and laterally spread to opposite sides of the frame, cheeks formed with the shield and directed toward the said keeper and having a seat for receiving the pointed end of said tine when engaged in the shield, a spring associated with the frame and coacting with the shield for tensioning the same under eccentric movement thereof, the said keeper being constructed to guide the pointed end of the tine in the direction of the seat for the entry of the pointed end therein, and an eye formed in the frame for pivotally connecting the shield therewith.

4. A safety pin comprising a frame having a springy pointed tine, an eccentric movable shield connected with said frame and receiving the pointed end of said tine, a keeper formed with the shield and laterally spread to opposite sides of the frame, cheeks formed with the shield and directed toward the said keeper and having a seat for receiving the pointed end of said tine when engaged in the shield, a spring associated with the frame and coacting with the shield for tensioning the same under eccentric movement thereof, the said keeper being constructed to guide the pointed end of the tine in the direction of the seat for the entry of the pointed end therein, an eye formed in the frame for pivotally connecting the shield therewith, and a pivot connecting the shield and the eye together.

5. A safety pin comprising a frame having a springy pointed tine, an eccentric movable shield connected with said frame and receiving the pointed end of said tine, a keeper formed with the shield and laterally spread to opposite sides of the frame, cheeks formed with the shield and directed toward the said keeper and having a seat for receiving the pointed end of said tine when engaged in the shield, a spring associated with the frame and coacting with the shield for tensioning the same under eccentric movement thereof, the said keeper being constructed to guide the pointed end of the tine in the direction of the seat for the entry of the pointed end therein, an eye formed in the frame for pivotally connecting the shield therewith, a pivot connecting the shield and the eye together, and a stop formed with the pointed tine.

PAUL K. MORRIS.